April 27, 1965
W. C. ROGERS
3,181,100
ROTATABLE ANTENNA CONNECTOR
Filed Dec. 8, 1961
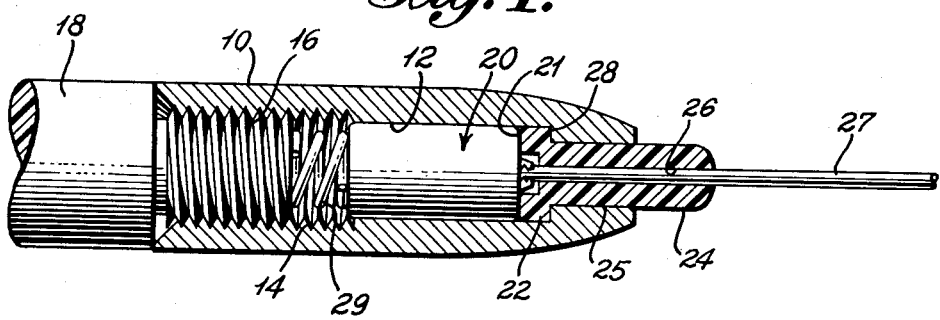
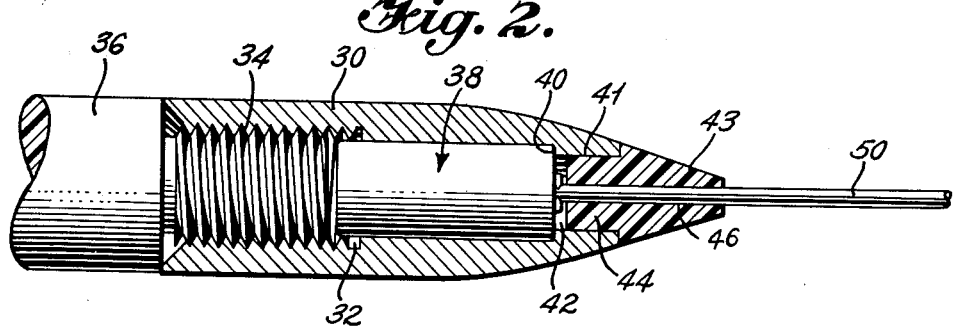
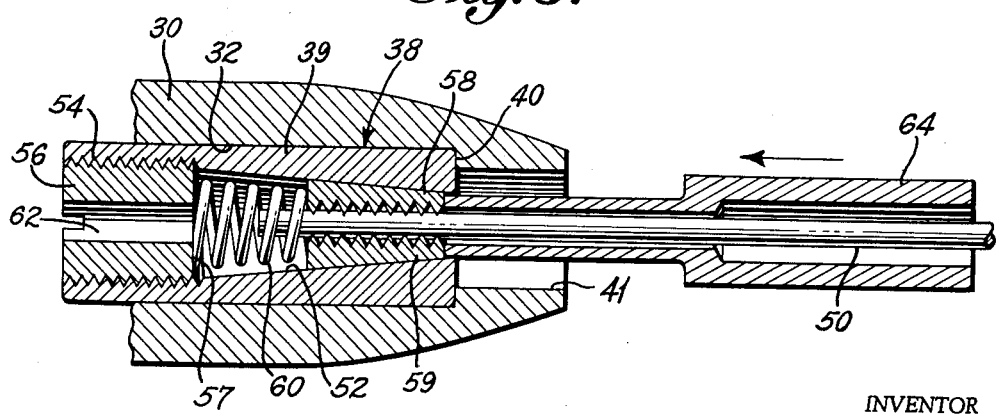
INVENTOR
William C. Rogers
BY
Burns, Doane, Benedict, Swecker & Mathis
ATTORNEYS United States Patent Office 3,181,100
Patented Apr. 27, 1965

3,181,100
ROTATABLE ANTENNA CONNECTOR
William C. Rogers, 5365 NW. 36th St.,
Miami Springs, Fla.
Filed Dec. 8, 1961, Ser. No. 157,932
2 Claims. (Cl. 339—8)

The present invention relates generally to antenna connectors, and more particularly to antenna connectors for use in aircraft antenna assemblies.

There has been a long-standing problem in the operation of aircraft radio equipment of overcoming static interference. Aircraft in flight become highly electrified, particularly so during flights through areas of precipitation which become charged to a potential where corona discharges will occur at various points on the aircraft. When corona discharges take place at points on the aircraft adjacent the antenna, the resulting noise pulses are generally so severe so as to render the radio equipment useless.

Another problem encountered in antenna systems of this type is the provision for easy replacement of the antenna wire when it has been broken. Many connectors for aircraft antenna which are designed in an attempt to overcome the problem of corona discharge are very often connected to the aircraft body in locations where it is impossible or at least very difficult to reach the antenna connector from the interior of the aircraft body. It is therefore necessary that in order to replace a broken antenna wire, the connector be completely disassembled from the exterior of the aircraft body which involves considerable time and labor.

Many of the connectors now in use embody a gripping means for gripping the antenna wire so that the wire is maintained rigidly within the connector with no provision for any movement of the wire relative to the connector. In flight, it is generally common that the antenna wire is subjected to a rotational strain relative to the connectors. This is often produced by relative movement of the various parts of the aircraft body. This is particularly true in smaller aircraft wherein the body is more flexible. Even though such movement may be slight, it imposes an additional strain on the wire which is already under considerable tensional strain. This strain often results in breakage of the antenna wire. The rotation force imposed on the wire also results in a strain on the connector and may damage it in such a way so as to reduce or destroy the anti-corona effectiveness of the connector.

It is therefore an object of this invention to provide an antenna connector to overcome these problems.

It is a more particular object of this invention to provide an antenna connector capable of withstanding high voltage and also capable of preventing rotational stresses in the antenna wire during flight.

It is a further object of this invention to provide an antenna coupling in which the antenna wire may be replaced quickly from the exterior of the aircraft body.

These and other objects may be accomplished according to several embodiments of the invention by providing a connector for the antenna wire which is adapted to be connected to suitable anchor means on the aircraft. The connector has a chuck mounted therein for rotational movement relative to the connector body and restrained from outward longitudinal movement by suitable thrust bearing means. The connector end which receives the antenna wire may be provided with suitable closing means adapted to permit an uninsulated antenna wire to enter into the chuck within the connector.

In one embodiment of the invention, the thrust bearing surface is formed by a shoulder integral with the end closing means of the connector. In this embodiment, it is preferred that the end closing means consist of a suitable material having antifrictional properties so as to form a thrust bearing surface which will offer little or no resistance to the rotational movement of the chuck.

In another embodiment of the invention, the thrust bearing surface is formed by a shoulder integral with the connector body. In this embodiment, the surface forming the bearing surface may be ground to a smooth finish so as to offer as little frictional resistance to the rotation of the chuck as possible.

Also in one embodiment of the invention, the end closing means of the connector may be constructed so as to be removable easily from the exterior of the connector.

These embodiments of the invention are illustrated in the accompanying drawings, in which:

FIGURE 1 is a partial side sectional view of one embodiment of the connector and a side elevational view of the chuck in position in the connector with a portion of antenna wire held therein;

FIGURE 2 is a partial side sectional view of a second embodiment of the connector and a side elevational view of the chuck in position in the connector with a portion of antenna wire held therein; and FIGURE 3 is an enlarged side sectional view of the chuck of FIG. 2 and a tool in position for releasing the chuck jaws to permit withdrawal of the antenna wire.

The connector is comprised of a cylindrical casing 10 which is tapered at its one end to present a streamline form. The casing 10 has a bore 12 therein which is provided with threads 14 for engaging a stud 16 on suitable anchor means 18 which is adapted to be connected to the aircraft body, either directly by means of a lead-through type fitting, or indirectly by means of supporting wires or the like. A chuck 20 is slidably disposed within the mating bore 12 of the casing 10. The chuck 20 is free to rotate within the cylinder casing 10 but is restrained from outward longitudinal movement by a thrust bearing surface in the interior of the casing 10. The internal details of chuck 20 are as described for chuck 38, FIG. 3.

In the embodiment disclosed in FIGURE 1, the thrust bearing surface 21 is formed by a radial shoulder 22 on a bushing 24 which extends through a second bore 25 and beyond the end of the casing 10. The bushing 24 has an opening 26 extending therethrough to receive a portion 27 of an uninsulated antenna wire, and may consist of a suitable dielectric having antifrictional properties such as nylon or the equivalent. The shoulder 22 of the bushing 24 abuts the shoulder 28 of the second bore 25 which is of smaller diameter than the bore 12.

The chuck 20 may be urged into abutting engagement with the thrust bearing surface 21 of the shoulder 22 by a spring 29. The spring 29 is disposed in the bore 12 between the end of the stud 16 and one end of the chuck 20.

In some instances a longer chuck may be used and in such cases, the chuck would be held against the thrust bearing surface of the shoulder 22 by the stud 16 coming into direct contact with the chuck, as shown at 34, 38 in FIGURE 2.

The embodiment disclosed in FIGURE 2 consists of a cylindrical casing 30, similar in shape to that of the cylinder casing 10, and having a longitudinal bore 32 therethrough which is adapted at one end to receive threadably a stud 34 of anchor means 36. A chuck 38 is rotatably disposed within the bore 32 and abuts a thrust bearing surface 40 of a shoulder 41. The shoulder 41 extends radially inwardly of the wall of the bore 32 and forms a cylindrical cavity 42. The chuck 38 is held in abutting engagement with the thrust bearing surface 40 by the stud 34. Preferably the thrust bearing surface 40 is machined in a manner so as to be as smooth as possible to reduce friction when the chuck 38 rotates relative thereto.

This embodiment may also employ a short chuck, and in that event a spring would be disposed between the chuck and the stud as shown in FIGURE 1.

A bushing 43 has a necked down portion 44 disposed within the cavity 42. The bushing 43 is held within the cavity 42 by frictional engagement of the walls of the bushing with the walls of the cavity 42. This arrangement provides for easy removal of the bushing 43. The bushing 43 may consist of suitable dielectric such as nylon and is preferably shaped to conform with the streamline form of the casing 30. The bushing 43 has a longitudinally extending bore 46 for passage therethrough of a wire portion 50 of an uninsulated antenna wire. With this construction the bushing 43 may be removed easily by merely exerting a pulling force on the bushing 43.

The chuck 38, shown in FIGURE 2, differs from the chuck 20, shown in FIGURE 1, only in overall length. The internal construction is otherwise identical, and it will therefore suffice to discuss in detail the construction of the one chuck 38.

The chuck 38 consists of a cylindrical body 39 having a conical-shaped opening 52 extending inwardly from one end of the body 39. A threaded bore 54 extends inwardly from the other end of the body 39 and terminates adjacent the end of the conical-shaped opening 52. A plug 56 is threadably engaged with the bore 54 for presenting a supporting surface 57 adjacent the end of the conical-shaped opening 52. A pair of jaws 58 and 59 are slidably disposed in conical-shaped opening 52 and have teeth thereon for gripping a portion of an antenna wire. The jaws 58 and 59 are adapted to move throughout the length of the conical-shaped opening. The jaws 58 and 59 are semicircular in cross section and tapered along their longitudinal axis to conform to the shape of the conical-shaped opening 52. A spring 60 is disposed in the conical-shaped opening 52 with its one end engaged with the supporting surface 57 of the plug 56 and its other end in engagement with the inner end of the jaws 58 and 59 for urging the jaws into gripping position.

When an antenna wire is to be inserted into the connector, a portion of the wire is inserted against the front portion of the jaws 58 and 59. Pressure is exerted on the jaw members by pushing the wire inwardly to move the jaws 58 and 59 rearwardly against the force of the spring 60. Movement of the jaws 58 and 59 in this direction permits them to become separated due to the increased diameter of the conical-shaped opening 52. When the jaw members 58 and 59 are separated sufficiently for permitting entrance of the wire therebetween, the wire may be slipped between the jaws 58 and 59 and extended through an aperture 62 in the plug 56 to be operatively connected with the antenna system. The antenna wire having thus been properly positioned, is released and the spring 60 urges the jaws 58 and 59 into gripping position on the antenna wire because of the camming effect of the reduced diameter of the conical-shaped opening 52. It will be readily understood that with this construction any outward pull on the antenna wire will seat the jaws 58 and 59 more firmly on the antenna wire and increase the gripping action of the chuck 38.

While the invention has been described to be used with uninsulated antenna wire, it may also be used with insulated wire. In this case, the portion of the wire to be inserted on the connector would be stripped of its insulation and connected in the manner described above.

When it is desired to remove the wire portion from the connector, which may be necessary when the antenna wire has been broken, a tool 64 may be provided for facilitating removal of the broken portion of the wire which is held in the connector.

The tool 64 consists of a hollow tubular body which can be inserted over the broken portion of an antenna wire. A portion of the external diameter of the tool is slightly smaller than the small end of the conical-shaped opening 52 of the chuck 38. When the tool is inserted over the broken portion of the wire and positioned against the jaws of the chuck, the tool is then pushed manually inwardly of the connector for forcing the jaws 58 and 59 inwardly of the chuck body 38 and permitting them to move apart thereby releasing their grip on the broken portion of the antenna wire. The antenna wire may then be removed easily from the connector and a new wire inserted as described above.

In the embodiment shown in FIGURE 1, the connector body 10 must be removed from the anchor means 18 before the wire can be released from the chuck. The connector 10 is slid off the wire thereby exposing the chuck 20. The tool 64 is then slid over the broken portion of the wire and operated as described above to release the broken wire from the chuck.

In the embodiment shown in FIGURE 2, it is not necessary to remove the connector 30 from the anchor means 36. In this embodiment, the bushing 43 may be removed from the connector 30 by merely pulling the bushing 43 out of the cavity 42. The tool 64 may then be inserted into the cavity for engaging the chuck for releasing the wire as described above.

With this construction, it will be readily understood that an antenna wire may be replaced easily from the exterior of the aircraft.

It will also be understood that with this invention, an antenna wire is firmly held within the connector even when the antenna wire is under considerable tension. The manner in which the chuck holds the wire permits rotation of the wire relative to the connector body. The chuck engages the thrust bearing surface and is capable of rotational movement within the bore of the connector. In this manner, if any rotational force is exerted on the wire, the chuck may rotate with the wire thus relieving the strain on the wire and preventing breakage of the wire or damage to the connector.

With this construction, the antenna wire is also protected from sharp bending at the point of entrance into the connector. If the antenna wire is subjected to forces laterally of the longitudinal axis of the wire, the wire is apt to bend at the point where it enters the connector and is held rigidly therein. Such forces are often caused by wind and air currents when the aircraft is in flight. This bending imposes further strain on the wire, and repeated bending may break the wire at this point. With the present invention, the bushing at the end of the connector provides a compact, yieldable support for preventing such bending. Because of the inherent resiliency of the dielectric bushing, the portion of the antenna wire extending therethrough may move laterally relative to the longitudinal axis of the wire. There is materially less possibility of the wire bending sharply at the point of entrance of the wire into the bushing because of this movement.

The streamlined form of the connector and the bushing which insulates the antenna wire from any external part of the aircraft prevent corona discharge.

While the invention has been illustrated and described in certain embodiments, it is recognized that other variations and changes may be made therein without departing from the invention as set forth in the claims.

I claim:
1. An antenna connector comprising a streamlined cylindrical casing having longitudinal bore means extending therethrough, the portion of said bore means adjacent one end of said casing being adapted to be connected to anchor means, a chuck disposed in said bore means for receiving and gripping an antenna wire, said chuck being held loosely in said bore means for rotational movement relative thereto, said chuck means formed of a cylindrical body having a conical-shaped opening extending inwardly from one end of said body, a threaded bore extending inwardly from the other end of said body and terminating adjacent the end of said conical-shaped opening, a plug threadably secured in said threaded bore to form a supporting surface adjacent the end of said conical-shaped opening, a pair of jaws slidably disposed in said conical-shaped opening and having teeth thereon to grip a portion of an antenna wire, a spring disposed in said conical-shaped opening having its one end engaged with said supporting surface and its other end engaged with the inner end of said jaws for urging said jaws into gripping position, thrust bearing means disposed adjacent the other end of said bore means for permitting rotational movement of said chuck when said chuck is gripping an antenna wire, said bearing means consisting of a radial shoulder extending inwardly of said bore means, and a removable bushing disposed in said other end for insulating an antenna wire from the connector casing.

2. In combination, a streamlined antenna connector casing having longitudinal bore means extending therethrough, a portion of said bore means adjacent one end of said casing being connected to anchor means, a cylindrical chuck disposed in said bore means for releasably receiving and gripping an antenna wire, said chuck being rotatable in said bore means relative to said casing, thrust bearing means disposed adjacent the other end of said bore means for preventing longitudinal movement of said chuck while permitting rotational movement of the chuck, an antenna wire under tension gripped by one end of said chuck and holding said chuck against said bearing means, said chuck being unrestrained at its opposite end, a dielectric bushing in said other end of said bore means, said bushing being removable from said bore means to provide access to said chuck, with there being an unobstructed bore portion between said removable bushing and said chuck.

References Cited by the Examiner

UNITED STATES PATENTS

| | | | |
|---|---|---|---|
| 2,120,469 | 6/38 | Kyle | 339—273 X |
| 2,626,353 | 1/53 | McGee | 174—79 X |
| 2,862,743 | 12/58 | Pierce et al. | 287—91 |
| 2,873,482 | 2/59 | Bridge et al. | 174—79 X |
| 3,039,341 | 6/62 | Stieglitz | 279—60 X |

OTHER REFERENCES

Du Pont Plastics Bulletin No. 47 (1950), page 2.

JOSEPH D. SEERS, *Primary Examiner*.

ALFRED S. TRASK, *Examiner*.